(12) United States Patent
Hara et al.

(10) Patent No.: US 10,001,602 B2
(45) Date of Patent: Jun. 19, 2018

(54) POLARIZATION-COMBINING MODULE

(71) Applicant: Sumitomo Osaka Cement Co., Ltd, Tokyo (JP)

(72) Inventors: Tokutaka Hara, Tokyo (JP); Toshio Kataoka, Tokyo (JP)

(73) Assignee: SUMITOMO OSAKA CEMENT CO., LTD., Chiyoda-Ku, Tokyo (JP)

( * ) Notice: Subject to any disclaimer, the term of this patent is extended or adjusted under 35 U.S.C. 154(b) by 0 days. days.

(21) Appl. No.: 15/515,895

(22) PCT Filed: Apr. 28, 2016

(86) PCT No.: PCT/JP2016/063373
§ 371 (c)(1),
(2) Date: Mar. 30, 2017

(87) PCT Pub. No.: WO2016/175288
PCT Pub. Date: Nov. 3, 2016

(65) Prior Publication Data
US 2017/0299813 A1 Oct. 19, 2017

(30) Foreign Application Priority Data
Apr. 28, 2015 (JP) .................. 2015-092183

(51) Int. Cl.
*G02B 6/30* (2006.01)
*G02B 6/27* (2006.01)
(Continued)

(52) U.S. Cl.
CPC ......... *G02B 6/2773* (2013.01); *G02B 6/2766* (2013.01); *G02B 27/283* (2013.01); *G02B 6/024* (2013.01)

(58) Field of Classification Search
USPC ................................. 385/1, 11, 47
See application file for complete search history.

(56) References Cited

U.S. PATENT DOCUMENTS 4,978,189 A * 12/1990 Blonder ............... G02B 6/2746
359/484.06
5,848,092 A   12/1998 Mitsumoto et al.
(Continued)

FOREIGN PATENT DOCUMENTS

JP   H06273698 A   9/1994
JP   H08186307 A   7/1996
(Continued)

OTHER PUBLICATIONS

International Search Report of PCT/JP2016/063373 dated Aug. 9, 2016.

*Primary Examiner* — Eric Wong
(74) *Attorney, Agent, or Firm* — Taft Stettinius & Hollister LLP

(57) ABSTRACT

Provided is a polarization-combining module in which it is possible to suppress deviation of an optical axis in a polarization-combining optical system and to perform efficient polarization combination with a less optical loss.
A polarization-combining module includes: a PBS 4 which combines two linearly polarized lights input and emits the combined light; a λ/2 wavelength plate 3 which is provided on an optical path of at least one of the two linearly polarized lights which are input to the PBS 4, and provides polarization rotation by a predetermined angle to the linearly polarized light that passes therethrough; and a pedestal member 10 on which the λ/2 wavelength plate 3 and the PBS 4 are mounted, in which the pedestal member 10 has a protrusion part 12 which defines mounting positions of the λ/2 wavelength plate 3 and the PBS 4 so as to be separated from each other and be parallel to each other, and the λ/2 wavelength plate 3 and the PBS 4 are mounted on the pedestal member 10 with apart of each of the λ/2 wavelength plate 3 and the PBS 4 being brought into contact with the protrusion part 12.

3 Claims, 3 Drawing Sheets

(51) Int. Cl.
*G02B 27/28* (2006.01)
*G02B 6/024* (2006.01)

(56) References Cited

U.S. PATENT DOCUMENTS

| | | | |
|---|---|---|---|
| 8,570,644 | B2 | 10/2013 | Oguri |
| 2002/0093738 | A1* | 7/2002 | Kimura ................ G02B 6/4218 359/489.05 |
| 2002/0181067 | A1* | 12/2002 | Romanovsky ............ G01J 1/26 359/237 |
| 2010/0119189 | A1* | 5/2010 | Nasu .................. G02B 6/12007 385/1 |
| 2015/0378237 | A1 | 12/2015 | Okamura et al. |

FOREIGN PATENT DOCUMENTS

| | | |
|---|---|---|
| JP | H11298068 A | 10/1999 |
| JP | 2007286481 A | 11/2007 |
| JP | 2010156842 A | 7/2010 |
| JP | 2012047953 A | 3/2012 |
| JP | 2014149398 A | 8/2014 |
| JP | 2014199364 A | 10/2014 |

* cited by examiner

POLARIZATION-COMBINING MODULE

TECHNICAL FIELD

The present invention relates to a polarization-combining module and in particular, to a polarization-combining module using a polarization rotation element and a light-combining element.

BACKGROUND ART

In an optical communication field and an optical measurement field, an optical modulation module such as an optical modulator in which an optical waveguide and a control electrode for controlling light waves propagating through the optical waveguide are provided in a substrate is frequently used.

Such an optical modulation module has, for example, a configuration in which two sets of Mach-Zehnder type optical waveguides are provided on a substrate having an electro-optic effect, a plane of polarization of one or both of light waves (linearly polarized lights) emitted from the respective optical waveguides is rotated, polarization-combining is performed in the relationship that the planes of polarization are orthogonal to each other, and the polarization-combined light is output.

With regard to the polarization-combining as described above, Patent Literature No. 1 discloses a configuration in which rutile is used for the polarization-combining. However, the full length of a polarization-combining optical system becomes longer, and therefore, there is a problem in which a reduction of the size of an optical modulation module is difficult.

In contrast, as in Patent Literature No. 2 or Patent Literature No. 3, by using a polarizing beam splitter (PBS) for the polarization-combining, it becomes possible to reduce the size of an optical modulation module, compared to a case of using rutile.

However, in Patent Literature No. 2, a configuration is made in which two input surfaces of making light waves be input to the PBS are in the positional relationship of being orthogonal to each other and the light wave on one side is reflected by a reflecting mirror which is a separate body from the PBS, and then led to the PBS. Therefore, there is a problem of lack of the stability of an optical axis. Further, in Patent Literature No. 3, although a PBS with a reflecting mirror integrated therewith is disclosed, how to fix a wavelength plate is not fully considered.

In FIG. 1, similar to Patent Literature No. 3, a polarization-combining optical system configured by using a wavelength plate and a PBS with a reflecting mirror integrated therewith is shown. In the drawing, a ½ wavelength plate 3 is provided on one of two optical paths in which two light waves (linearly polarized lights) which are emitted from an emitting lens array 2 connected to emitting ends of two optical waveguides 1 reach a PBS 4.

Due to this configuration, in a case where two polarized lights (hereinafter referred to as horizontally polarized lights) L1 and L2 each having a polarization direction parallel to the plane of the paper are emitted from the emitting lens array 2, the horizontally polarized light L1 on one side is polarization rotated by 90 degrees at the λ/2 wavelength plate 3, thereby being converted into a polarized light having a polarization direction perpendicular to the plane of the paper (hereinafter, referred to as a vertically polarized light L3), and is input to the PBS 4. The horizontally polarized light L2 on the other side is directly input to the PBS 4 and is combined by the PBS 4. A combined light L4 which is obtained by such polarization-combining is output through an emitting collimator 7 composed of a condensing lens 5, a ferrule 6 with a polarization maintaining fiber, and the like.

However, in a case of using a very thin wavelength plate having a thickness of the order of several tens of μm, it is difficult to fix the wavelength plate at a desired angle, and it is difficult to maintain the parallelism between the wavelength plate and the PBS. For this reason, depending on the slope of the wavelength plate, the light wave after transmission through the wavelength plate does not become a complete linear polarization, and thus there is a problem in which an optical loss occurs in the PBS, or the light wave is shifted, whereby a coupling loss occurs in the emitting collimator 7.

Further, it is also conceivable to integrate the wavelength plate and the PBS by bonding the wavelength plate to the PBS. However, the wavelength plate is very thin and thus handling thereof is difficult, and it is difficult to maintain the parallelism between the wavelength plate and the PBS due to the surface tension or the like of an adhesive for bonding the wavelength plate and the PBS to each other. Further, there is also a possibility that an adhesive may enter another optical path, thereby causing an optical loss.

CITATION LIST

Patent Literature

[Patent Literature No. 1] Japanese Laid-open Patent Publication No. 2014-149398

[Patent Literature No. 2] Japanese Laid-open Patent Publication No. 2012-047953

[Patent Literature No. 3] Japanese Laid-open Patent Publication No. 2014-199364

SUMMARY OF INVENTION

Technical Problem

An object of the present invention is to solve the problems as described above and provide a polarization-combining module in which it is possible to suppress deviation of an optical axis in a polarization-combining optical system and to perform efficient polarization-combining with a less optical loss.

Solution to Problem

In order to solve the above problems, a polarization-combining module according to the present invention has the following technical features.

(1) A polarization-combining module includes: a light-combining element which combines two linearly polarized lights input and emits the combined light; a polarization rotation element which is provided on an optical path of at least one of the two linearly polarized lights which are input to the light-combining element, and provides polarization rotation by a predetermined angle to the linearly polarized light that passes therethrough; and a pedestal member on which the polarization rotation element and the light-combining element are mounted, and the pedestal member has a protrusion part which defines mounting positions of the polarization rotation element and the light-combining element so as to be separated from each other and be parallel to each other, and the polarization rotation element and the light-combining element are mounted on the pedestal member with apart of each of the polarization rotation element and the light-combining element being brought into contact with the protrusion part.

Here, the expression "contact" as referred to in the present invention includes not only an aspect in which the respective members are brought into direct contact with each other, but also an aspect in which an adhesive is interposed between the members.

(2) In the polarization-combining module according to the above (1), the protrusion part has a convex shape which protrudes from a mounting surface for the polarization rotation element and the light-combining element in the pedestal member, and the polarization rotation element and the light-combining element are mounted on the pedestal member to be brought into contact with vertical surfaces of the protrusion part such that the protrusion part is sandwiched between a portion of a light emitting surface of the polarization rotation element and a portion of a light input surface of the light-combining element.

(3) In the polarization-combining module according to the above (1) or (2), the polarization rotation element is a wavelength plate, and a part of the wavelength plate is bonded and fixed to the protrusion part.

(4) In the polarization-combining module according to any one of the above (1) to (3), the polarization-combining module is embedded in a package case of an optical modulation module, and the pedestal member is mounted in the package case of the optical modulation module with an end face on the light emitting side of the pedestal member being brought into contact with an inner wall surface of the package case of the optical modulation module.

Advantageous Effects of Invention

According to the present invention, the pedestal member on which the polarization rotation element and the light-combining element are mounted has a protrusion part which defines the mounting positions of the polarization rotation element and the light-combining element so as to be separated from each other, and the polarization rotation element and the light-combining element are mounted on the pedestal member with a part of each of the polarization rotation element and the light-combining element being brought into contact with the protrusion part. Accordingly, it is easy to maintain the parallelism between the polarization rotation element and the light-combining element, compared to the configuration of the related art in which a wavelength plate is bonded to and integrated with a PBS, and the polarization rotation element and the light-combining element can be mounted at an angle (a designed angle) determined with respect to the optical axis of each light wave. For this reason, it is possible to provide a polarization-combining module in which it is possible to suppress deviation of an optical axis in a polarization-combining optical system and to perform efficient polarization-combining with a less optical loss.

DESCRIPTION OF EMBODIMENTS

Hereinafter, a polarization-combining module according to the present invention will be described in detail by using a preferred embodiment.

In the following, a polarization-combining module which is embedded in a package case of an optical modulation module will be described as an example.

Figure 1:
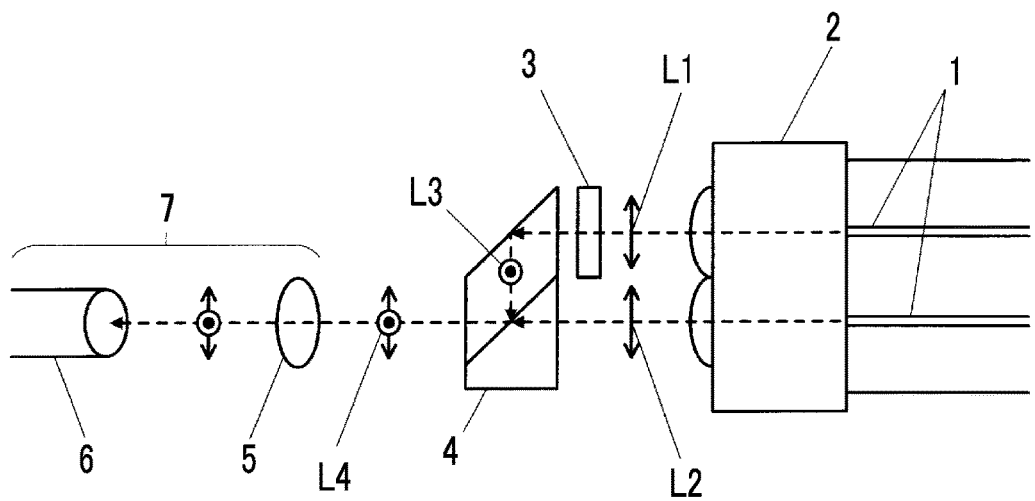
FIG. 1 is a diagram showing the outline of a polarization-combining optical system according to the related art.
Figure 2A:
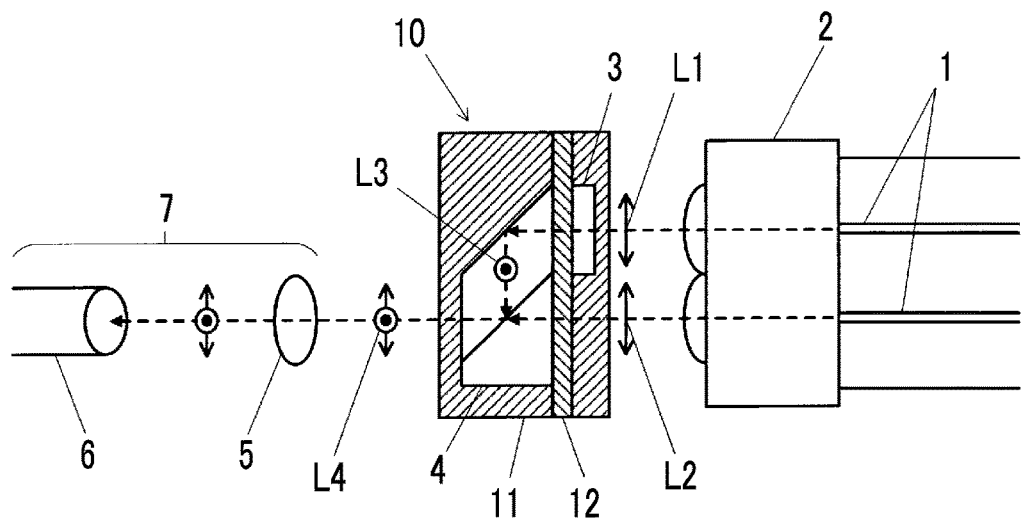
FIGS. 2A and 2B are diagrams showing the outline of a polarization-combining optical system according to the present invention.
Figure 2B:
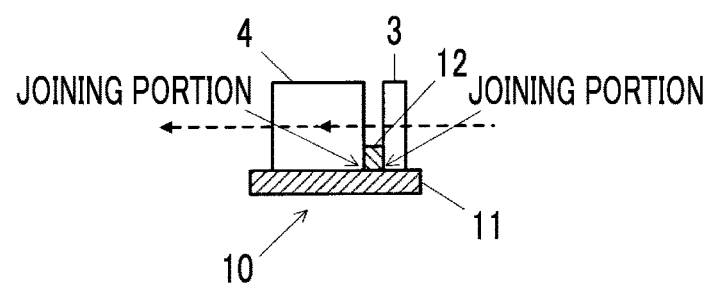

FIGS. 2A and 2B are diagrams showing the outline of a polarization-combining optical system in an optical modulation module, in which FIG. 2A is a plan view and FIG. 2B is a side view.

In the drawings, two horizontally polarized lights L1 and L2 are emitted parallel to each other from an emitting lens array 2 connected to emitting ends of two optical waveguides 1. The horizontally polarized light L1 on one side is polarization rotated by 90 degrees at a λ/2 wavelength plate 3, thereby being converted into a vertically polarized light L3, and is then led to a PBS 4, and the horizontally polarized light L2 on the other side is directly led to the PBS 4. In this example, as the λ/2 wavelength plate 3, a λ/2 wavelength plate having a thickness of the order of several tens of μm is used.

The PBS 4 has a configuration in which a first glass base material having an input surface for the vertically polarized light L3 and a second glass base material having an input surface for the horizontally polarized light L2 are disposed such that these input surfaces are on the same plane, and joined to each other. Further, on the joint surface of each of the glass base materials, a dielectric multilayer film having a property of reflecting the vertically polarized light L3 while transmitting the horizontally polarized light L2 is provided, thereby forming a polarization-combining surface. Further, on the first glass base material, an opposite surface to the joint surface is formed parallel to the joint surface, and a reflective film is provided on the opposite surface, thereby forming a reflecting mirror. Due to such a configuration, the vertically polarized light L3 which has been input to the PBS 4 is reflected toward the polarization-combining surface by the reflecting mirror, and combined with the horizontally polarized light L2 which has been input to the PBS 4, at the polarization-combining surface.

A combined light L4 combined by the PBS 4 is output from the package case of the optical modulation module through an emitting collimator 7 composed of a condensing lens 5, a ferrule 6 with a polarization maintaining fiber, and the like.

Here, in the polarization-combining optical system of this example, the λ/2 wavelength plate 3 and the PBS 4 are mounted on and fixed to a pedestal member 10, thereby forming a single part. A module formed as such a single part is referred to as a polarization-combining module.

The pedestal member 10 has a base part 11 and a protrusion part 12 protruding from the base part 11. In this example, as the pedestal member 10, a pedestal member made of metal is used. However, a pedestal member formed of another material such as glass or ceramic can also be used. Further, in this example, a configuration is made in which the base part 11 and the protrusion part 12 are configured as individual parts and are integrated with each other by an adhesive, solder, laser welding, or the like.

The protrusion part 12 is for defining the mounting positions of the λ/2 wavelength plate 3 and the PBS 4 with respect to the pedestal member 10 and is set such that the λ/2 wavelength plate 3 and the PBS 4 are separated from each other and are parallel to each other. The protrusion part 12 of this example has a convex shape vertically protruding from the surface of the base part 11 and having a constant width. That is, the protrusion part 12 of this example is made such that both sides of a linearly extending convex shape become vertical surfaces parallel to each other, a part (a lower portion) of the light emitting surface of the λ/2 wavelength plate 3 is brought into contact with the vertical surface on one side, and a part (a lower portion) of the light input surface of the PBS 4 is brought into contact with the vertical surface on the other side. In this manner, in this example, the λ/2 wavelength plate 3 and the PBS 4 are mounted on the pedestal member 10 with them being brought into contact with the protrusion part 12 such that the protrusion part 12 is sandwiched between a portion of the light emitting surface of the λ/2 wavelength plate 3 and a portion of the light input surface of the PBS 4.

The λ/2 wavelength plate 3 and the PBS 4 mounted on the pedestal member 10 are fixed to the pedestal member 10 by an adhesive. The adhesion of the λ/2 wavelength plate 3 to the pedestal member 10 is performed, as an example, by an adhesive applied between the vertical surface of the protrusion part 12 and the λ/2 wavelength plate 3. However, an adhesive may also be applied between the surface of the base part 11 and the λ/2 wavelength plate 3, and an adhesive may also be applied to both of the areas between the vertical surface of the protrusion part 12 and the λ/2 wavelength plate 3 and between the surface of the base part 11 and the λ/2 wavelength plate 3. Further, the adhesion of the PBS 4 to the pedestal member 10 is performed, as an example, by an adhesive applied between the upper surface of the base part 11 and the PBS 4. However, an adhesive may also be applied between the vertical surface of the protrusion part 12 and the PBS 4, and an adhesive may also be applied to both of the areas between the upper surface of the base part 11 and the PBS 4 and between the vertical surface of the protrusion part 12 and the PBS 4.

As described above, the polarization-combining module of this example has a configuration in which it is provided with: the PBS 4 which combines two linearly polarized lights input and emits the combined light; the λ/2 wavelength plate 3 which is provided on an optical path of at least one of the two linearly polarized lights which are input to the PBS 4, and provides polarization rotation by a predetermined angle to the linearly polarized light that passes therethrough; and the pedestal member 10 on which the λ/2 wavelength plate 3 and the PBS 4 are mounted, in which the pedestal member 10 has a protrusion part 12 which defines the mounting positions of the λ/2 wavelength plate 3 and the PBS 4 so as to be separated from each other and be parallel to each other, and the λ/2 wavelength plate 3 and the PBS 4 are mounted on the pedestal member 10 with a part of each of the λ/2 wavelength plate 3 and the PBS 4 being brought into contact with the protrusion part 12.

Due to such a configuration, the λ/2 wavelength plate 3 and the PBS 4 can be fixed to be mounted on the pedestal member 10 with a distance corresponding to the width (a constant width) of the protrusion part 12 therebetween, and parallel to each other. For this reason, it is easy to maintain the parallelism between the λ/2 wavelength plate 3 and the PBS 4, and the λ/2 wavelength plate 3 and the PBS 4 can be mounted at an angle (a designed angle) which is determined with respect to the optical axis of each light wave.

Therefore, according to the polarization-combining module of this example, deviation of the optical axis can be effectively suppressed, and it becomes possible to perform efficient polarization-combining with a less optical loss. Further, polarization-combining with less characteristic variation can be realized.

Further, in the polarization-combining module of this example, the λ/2 wavelength plate 3 and the PBS 4 are respectively brought into contact with the vertical surfaces of the protrusion part 12 such that the protrusion part 12 is sandwiched between a portion of the light emitting surface of the λ/2 wavelength plate 3 and a portion of the light input surface of the PBS 4, and therefore, it is possible to easily carry out a process of fixing the λ/2 wavelength plate 3 and the PBS 4 in a parallel state.

Further, in this example, the base part 11 and the protrusion part 12 forms a configuration in which their individual parts are integrated. Due to such a configuration, it is possible to make joining portions of the base part 11 and the protrusion part 12 be substantially perpendicular to each other. For this reason, even if a corner of the λ/2 wavelength plate 3 or the PBS 4 comes into contact with the joining portion, occurrence of angular deviation of an input surface can be suppressed. Further, in this example, the base part 11 and the protrusion part 12 forms a configuration in which their individual parts are integrated. However, the base part 11 and the protrusion part 12 may not be made as individual parts and may be formed by integrated forming by grinding a single part. However, in this case, roundness (R) is generated in the joining portions of the base part 11 and the protrusion part 12, and a corner of the λ/2 wavelength plate 3 or the PBS 4 comes into contact with the round portion, and therefore, the stability of angular deviation of an input surface is slightly inferior compared to a configuration in which their individual parts are integrated. In this case, processing of removing the roundness (R) of the joining portions of the base part 11 and the protrusion part 12 may be further added such that a corner of the λ/2 wavelength plate 3 or the PBS 4 does not come into contact with the joining portion.

Here, if the λ/2 wavelength plate 3 is fixed to the vertical surface of the protrusion part 12 by an adhesive, the angle of the input surface for the light wave which is input to the λ/2 wavelength plate 3 is stabilized, and the rotation angle of the polarization is stabilized. Further, it is possible to reduce stress to the λ/2 wavelength plate 3 due to an adhesive, and therefore, it is possible to suppress a change of the birefringence amount of the λ/2 wavelength plate 3, and the effect of further stabilizing the rotation angle of the polarization is also obtained.

The polarization-combining module configured as described above is fixed to be mounted in the package case of the optical modulation module. The polarization-combining module of this example is mounted in the package case of the optical modulation module with the end face on the light emitting side of the pedestal member 10 being brought into contact with the inner wall surface of the package case of the optical modulation module. For this reason, the optical axis of the optical waveguide 1 and the relative positions and the angles of the λ/2 wavelength plate 3 and the PBS 4 are accurately determined with respect to the optical axis of each light wave, and therefore, the optical axis adjustment becomes easier and the stability of the optical axis after mounting is also increased.

Figure 3A:
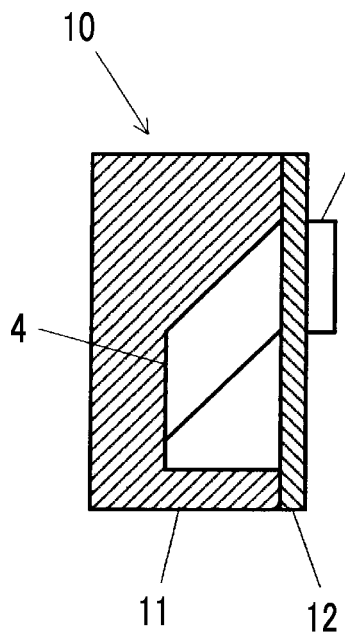
FIGS. 3A and 3B are diagrams showing another Configuration Example 1 of a polarization-combining module according to the present invention.
Figure 3B:
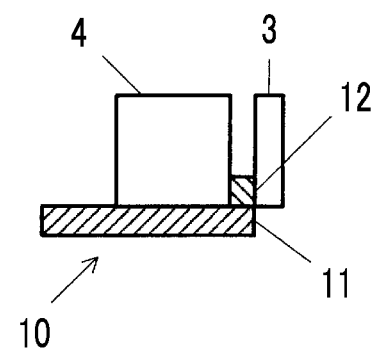

Here, as in another Configuration Example 1 of the polarization-combining module shown in FIGS. 3A and 3B, the protrusion part 12 may be provided at an end portion rather than the vicinity of the center of the base part 11.

Figure 4A:
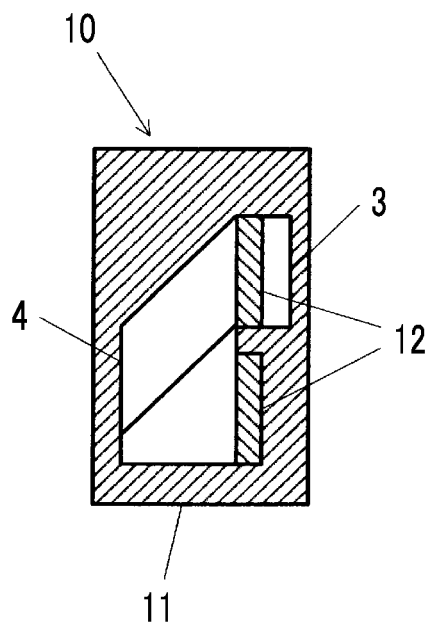
FIGS. 4A and 4B are diagrams showing another Configuration Example 2 of the polarization-combining module according to the present invention.
Figure 4B:
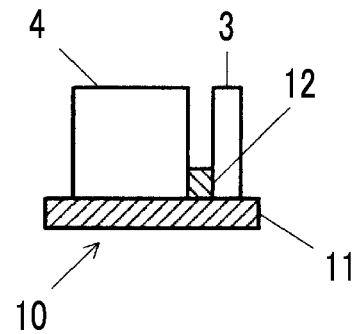

Further, as in another Configuration Example 2 of the polarization-combining module shown in FIGS. 4A and 4B, the protrusion part 12 having an intermittent shape broken at a portion, rather than a continuous shape, may be provided.

Figure 5A:
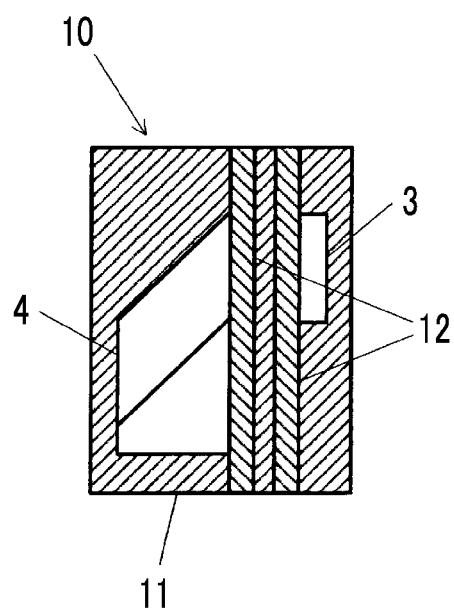
FIGS. 5A and 5B are diagrams showing another Configuration Example 3 of the polarization-combining module according to the present invention.
Figure 5B:
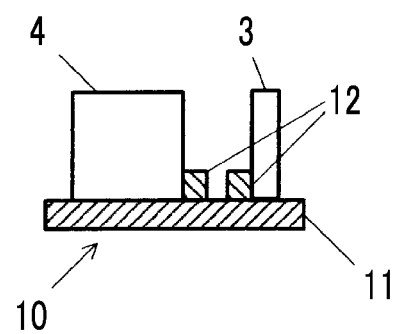

Further, as in another Configuration Example 3 of the polarization-combining module shown in FIGS. 5A and 5B, a plurality of parallel protrusion parts 12 may be provided.

Also in such configurations, the $\lambda/2$ wavelength plate 3 and the PBS 4 can be fixed to be mounted on the pedestal member 10 with a distance corresponding to the width (a constant width) of the protrusion part 12 therebetween, and parallel to each other, and therefore, deviation of the optical axis can be effectively suppressed, and it becomes possible to perform efficient polarization-combining with a less optical loss.

Further, for example, instead of the $\lambda/2$ wavelength plate 3, an arbitrary polarization rotation element which provides polarization rotation by a predetermined angle to a linearly polarized light that passes therethrough can also be used.

Further, for example, instead of the PBS 4, an arbitrary light-combining element which combines two linearly polarized lights input and emits the combined light can also be used.

Further, in the previous description, the polarization rotation element is provided on the optical path on one side in two light waves which are emitted from the emitting lens array 2 connected to the emitting ends of the two optical waveguides 1. However, the polarization rotation element may be provided on the optical path on the other side, and the polarization rotation elements may be provided on both the optical paths, and it is favorable if a design is made according to the characteristics or the like of another optical part (for example, the light-combining element).

An aspect of the present invention has been described above based on the examples. However, the present invention is not limited to the above-described contents, and it goes without saying that changes in design may be appropriately made within a scope which does not depart from the gist of the present invention.

INDUSTRIAL APPLICABILITY

As described above, according to the present invention, it is possible to provide a polarization-combining module in which it is possible to suppress deviation of an optical axis in a polarization-combining optical system and to perform efficient polarization-combining with a less optical loss.

REFERENCE SIGNS LIST

1: optical waveguide
2: emitting lens array
3: $\lambda/2$ wavelength plate
4: polarizing beam splitter (PBS)
5: condensing lens
6: ferrule (with a polarization maintaining fiber)
7: emitting collimator
10: pedestal member
11: base part
12: protrusion part
L1, L2: horizontally polarized light
L3: vertically polarized light
L4: combined light

The invention claimed is:

1. A polarization-combining module comprising:
   a light-combining element which combines two linearly polarized lights input and emits the combined light;
   a polarization rotation element which is provided on an optical path of at least one of the two linearly polarized lights which are input to the light-combining element, and provides polarization rotation by a predetermined angle to the linearly polarized light that passes therethrough; and
   a pedestal member on which the polarization rotation element and the light-combining element are mounted,
   wherein the pedestal member has a protrusion part which defines mounting positions of the polarization rotation element and the light-combining element so as to be separated from each other and be parallel to each other,
   the protrusion part has a convex shape which protrudes from a mounting surface for the polarization rotation element and the light-combining element in the pedestal member, and
   the polarization rotation element and the light-combining element are mounted on the pedestal member to be brought into contact with vertical surfaces of the protrusion part such that the protrusion part is sandwiched between a portion of a light emitting surface of the polarization rotation element and a portion of a light input surface of the light-combining element.

2. The polarization-combining module according to claim 1, wherein the polarization rotation element is a wavelength plate, and
   a part of the wavelength plate is bonded and fixed to the protrusion part.

3. The polarization-combining module according to claim 1, wherein the polarization-combining module is embedded in a package case of an optical modulation module, and
   the pedestal member is mounted in the package case of the optical modulation module with an end face on the light emitting side of the pedestal member being brought into contact with an inner wall surface of the package case of the optical modulation module.

* * * * *